(12) United States Patent
Huang et al.

(10) Patent No.: US 8,884,956 B2
(45) Date of Patent: Nov. 11, 2014

(54) SYSTEM AND METHOD FOR TRIMMED SURFACE TESSELLATION

(75) Inventors: Jianbing Huang, Shoreview, MN (US);
Michael B. Carter, Ames, IA (US);
Andreas Johannsen, Ames, IA (US);
Brett Harper, Ames, IA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 2223 days.

(21) Appl. No.: 11/837,402

(22) Filed: Aug. 10, 2007

(65) Prior Publication Data
US 2008/0043016 A1    Feb. 21, 2008

Related U.S. Application Data

(60) Provisional application No. 60/822,133, filed on Aug. 11, 2006.

(51) Int. Cl.
*G06T 17/20*    (2006.01)
(52) U.S. Cl.
CPC ..................................... *G06T 17/20* (2013.01)
USPC ........................................................ 345/423
(58) Field of Classification Search
None
See application file for complete search history.

(56) References Cited

U.S. PATENT DOCUMENTS

| 5,377,320 | A * | 12/1994 | Abi-Ezzi et al. ............... 345/502 |
| 6,618,851 | B1 * | 9/2003 | Zundel et al. .................. 717/103 |
| 6,920,415 | B1 * | 7/2005 | Litke et al. ........................ 703/2 |

OTHER PUBLICATIONS

Piegl L A et al: "Geometry-based triangulation of trimmed NURBS surfaces" Computer Aided Design, Elsevier Publishers BV., Barking, GB, vol. 30, No. 1, Jan. 1998 pp. 11-18, XP004112164 ISSN: 00100-4485 abstract p. 11, left-hand column, line 1-right-hand column, line 6 p. 12, right-hand column, last paragraph-p. 14, left-hand column, line 28.

Alliez P et al: "Anisotropic polygonal remeshing" ACM Transactions on Graphics ACM USA, vol. 22, No. 3, Jul. 2003, pp. 485-493, XP002463076 ISSN: 0730-0301 abstract p. 485, paragraph 1-p. 487, paragraph 1.3.

Rodrigues De Araujo et al: "Adaptive polygonization of implicit surfaces" Computers and Graphics, Elsevier, GB, vol. 29, No. 5, Oct. 2005, pp. 686-700, XP005130480 ISSN: 0097-8493 abstract p. 687, paragraph 2-p. 692, paragraph 4.

Lamot M et al: "Algorithms for triangulating simple polygons" Information Technology Interfaces, 2000. ITI 2000. Proceedings of the 22nd International Conference on Jun. 13-16, 2000, Piscataway, NJ, USA, IEEE, Jun. 13, 2000, pp. 429-436, XP010538672 ISBN: 953-96769-1-6 abstract p. 429, paragraph 1-p. 432, line 9.

Marinov M et al: "Direct anisotropic quad-dominant remeshing" Computer Graphics and Applications, 2004. p 2004. Proceedings. 12th Pacific Conference on Seoul, Korea Oct. 6-8, 2004, Piscataway, NJ, USA, IEEE, Oct. 6, 2004, pp. 207-216, XP010735042 ISBN: 0-7695-2234-3 abstract p. 207, paragraph 1-p. 209, paragraph 1.3-p. 211, paragraph 4-p. 214, paragraph 5.

* cited by examiner

*Primary Examiner* — Daniel Hajnik

(57) ABSTRACT

A system, method, and computer program for tessellation. A method includes tessellating a curve having a plurality of polygons, connecting said plurality of polygons in a preferred direction, and decomposing polygons into a plurality of triangles. A mesh representation is created from the plurality of triangles.

11 Claims, 4 Drawing Sheets

SYSTEM AND METHOD FOR TRIMMED SURFACE TESSELLATION

PRIORITY OF APPLICATION

The present application claims priority of U.S. provisional application Ser. No. 60/822,133 filed Aug. 11, 2006, which is incorporated herein by reference.

CROSS-REFERENCE TO RELATED APPLICATIONS

This application is related to U.S. Ser. No. 11/837,371, entitled "METHOD AND SYSTEM FOR ORGANIZING TOPOLOGY ELEMENTS FOR BETTER COMPRESSION" and U.S. Ser. No. 11/837,305, entitled "VISUAL FILE REPRESENTATION", both filed on even date herewith, which applications are incorporated by reference here.

TECHNICAL FIELD

The presently preferred embodiment of the innovations described herein relate generally to computer graphics software applications. More specifically, the presently preferred embodiment relates to a method and system for improving trimmed surface tessellation speed.

BACKGROUND

Geometric representation that is capable of comprehensive functionality requirements is becoming increasingly important for engineering visualization industry as three-dimensional ("3D") data usage is being expanded to non-engineering purposes such as training, maintenance, etc. 3D representation can result in geometric files growing in size from "light weight" (also "light" or "lw")) files can be less than 500 kilobytes to "heavy weight" (also "heavy" or "hw") files can be more than 2, 5 or 20 megabytes, for example. Light-weight 3D representation is crucial for collaborative visualization, where the visualization activity occurs in a distributed enterprise environment with the data being physically located on a different computer in the network (particularly if the visualization data must be transferred via LAN, WAN, email or any other low-bandwidth transmission medium).

Two important visualization functionalities are fast graphics display and accurate geometric analysis. Most visualization systems today use mesh representation in their file formats for maximum speed to reduce conversions from the file format to the graphics hardware, given that current graphics hardware is designed in a way such that its performance is best when the input data is represented in mesh format consisting of a collection of planar triangles. For better performance, several mesh representations of different details, usually call Level-Of-Detail or LOD, for the same part geometry may simultaneously exist in the file so that the graphics engine can choose to use less-detailed version for objects that are considered visually less significant in the scene. There are three major issues with LOD representation. First, LOD resolutions are fixed in the file format, so the curved surface may not appear smooth when zoomed-in, or magnified, thereby creating undesirable visual artifacts. Second, flat facets in mesh representation are merely linear approximations to the real object geometry. Some geometric operations, such as derivative computation, may not be meaningful at all for mesh, and other operations may not result in the desired accuracy. Third, LOD representations can be heavy even with state-of-art advanced compression. Fundamentally, flat facets, the basic element of LOD representation, does not exploit the intrinsic property of curved surface geometry.

An alternative format called Boundary Representation, or BREP, can be used for graphics display in the file format BREP contains accurate geometry description of object geometry in which the modeling primitives can be curved. BREP representation is also the industry standard for 3D representation in CAD packages where the engineering models are authored, and therefore contains necessary information for all kinds of geometric operations with required accuracy. However, BREP representation is heavy and frequently heavier than typical LOD representation. In addition, BREP surface representation in general can't be directly accepted by mainstream graphics APIs such as OpenGL and DirectX. Facet representation needs to be generated by BREP with a process commonly called tessellation, before the object can be displayed on screen. The speed of BREP tessellation is therefore critical for graphics performance. Including both LOD and BREP representations in the file would fulfill most graphics and geometry operations and requirements, but only at the cost of making the file size even bigger.

What is needed is a system, process, and method for improving the trimmed surface tessellation speed of a light model representation.

SUMMARY

To achieve the foregoing, and in accordance with the purpose of the presently preferred embodiment as broadly described herein, the present application provides a method for tessellation, comprising tessellating a curve having a plurality of polygons; connecting said plurality of polygons in a preferred direction; decomposing polygons into a plurality of triangles; and whereby a mesh representation is creating from said plurality of triangles. The method, further comprising tessellating a surface. The method, further comprising tessellating said curve by a conventional approach. The method, wherein said decomposition step occurs by monotone positioning. The method, wherein a model representation provides said curves for tessellation. The method, wherein said model representation is one of a BREP and a light model.

Another advantage of the presently preferred embodiment is to provide a system for tessellation, comprising a curve tessellation having a plurality of polygons; a connection of said plurality of polygons in a preferred direction; and a decomposed polygon consisting of a plurality of triangles. The system, further comprising a surface tessellation. The system, further comprising a curve tessellated by a conventional approach. The system, further comprising a model representation form that provides one of a BREP representation and a light model representation.

And another advantage of the presently preferred embodiment is to provide a computer-program product tangibly embodied in a machine readable medium to perform a method for tessellation, comprising instructions operable to cause a computer to tessellate a curve having a plurality of polygons; connect said plurality of polygons in a preferred direction; and decompose polygons into a plurality of triangles. The computer-program product, further comprising instructions to tessellate a surface. The computer-program product, further comprising instructions to tessellate said curve by a conventional approach. The computer-program product, wherein said decomposition instructions occur by monotone positioning. The computer-program product, wherein a model representation provides said curves for tessellation. The computer-program product of claim 15, wherein said model representation is one of a BREP and a light model.

And still another advantage of the presently preferred embodiment is to provide a data processing system having at least a processor and accessible memory to implement a method for tessellation, comprising means for tessellating a curve having a plurality of polygons; means for connecting said plurality of polygons in a preferred direction; and means for decomposing polygons into a plurality of triangles.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 4:
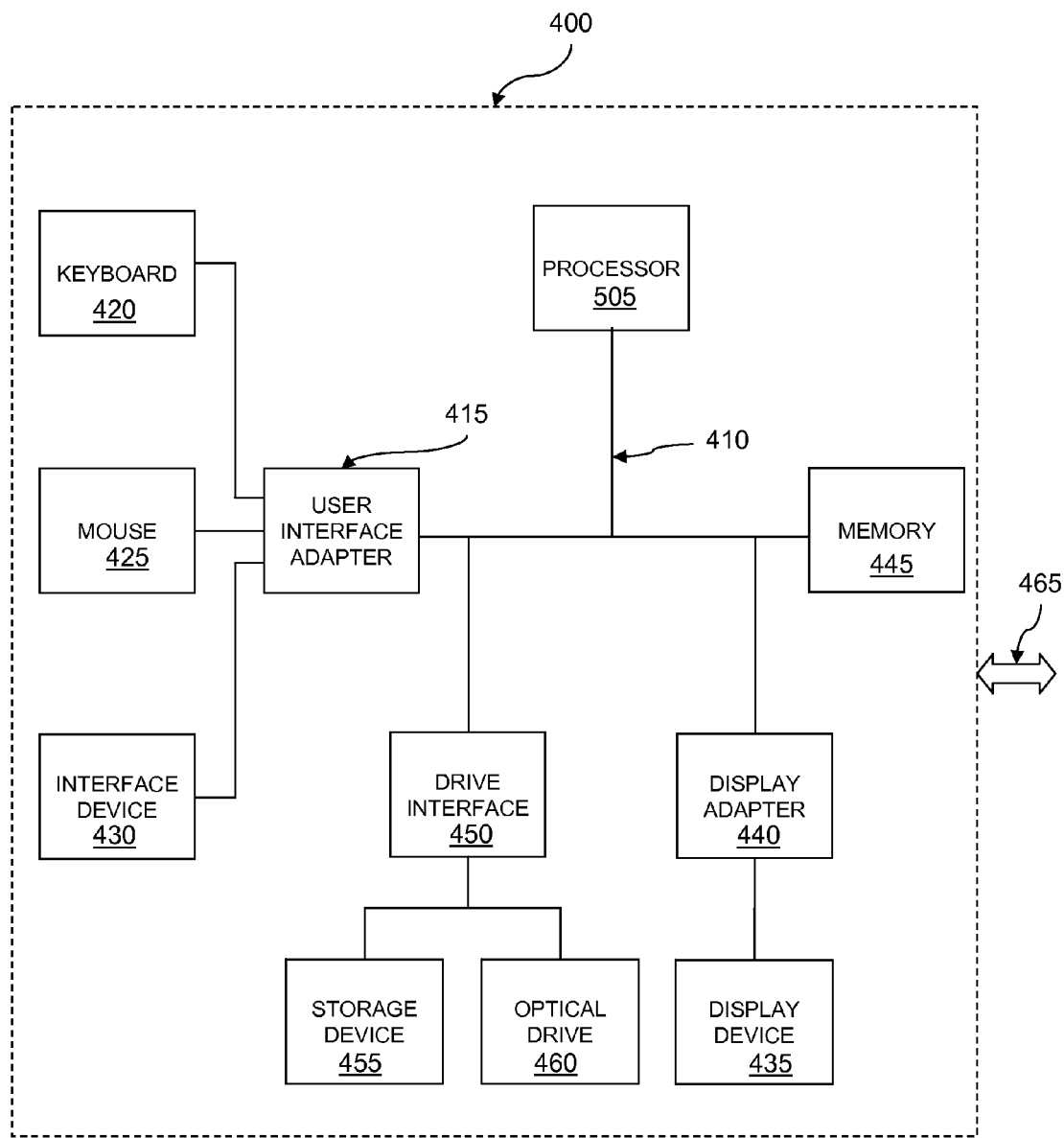
FIG. 4 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method for trimmed surface tessellation. Now therefore, in accordance with the presently preferred embodiment, an operating system executes on a computer, such as a general-purpose personal computer. FIG. 4 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Referring to FIG. 4, an exemplary system for implementing the presently preferred embodiment includes a general-purpose computing device in the form of a computer 400, such as a desktop or laptop computer, including a plurality of related peripheral devices (not depicted). The computer 400 includes a microprocessor 405 and a bus 410 employed to connect and enable communication between the microprocessor 405 and a plurality of components of the computer 400 in accordance with known techniques. The bus 410 may be any of several types of bus structures including a memory bus or memory controller, a peripheral bus, and a local bus using any of a variety of bus architectures. The computer 400 typically includes a user interface adapter 415, which connects the microprocessor 405 via the bus 410 to one or more interface devices, such as a keyboard 420, mouse 425, and/or other interface devices 430, which can be any user interface device, such as a touch sensitive screen, digitized pen entry pad, etc. The bus 410 also connects a display device 435, such as an LCD screen or monitor, to the microprocessor 405 via a display adapter 440. The bus 410 also connects the microprocessor 405 to a memory 445, which can include ROM, RAM, etc.

The computer 400 further includes a drive interface 450 that couples at least one storage device 455 and/or at least one optical drive 460 to the bus. The storage device 455 can include a hard disk drive, not shown, for reading and writing to a disk, a magnetic disk drive, not shown, for reading from or writing to a removable magnetic disk drive. Likewise the optical drive 460 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 400.

The computer 400 can communicate via a communications channel 465 with other computers or networks of computers. The computer 400 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 445 of the computer 400. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

System

Figure 1:
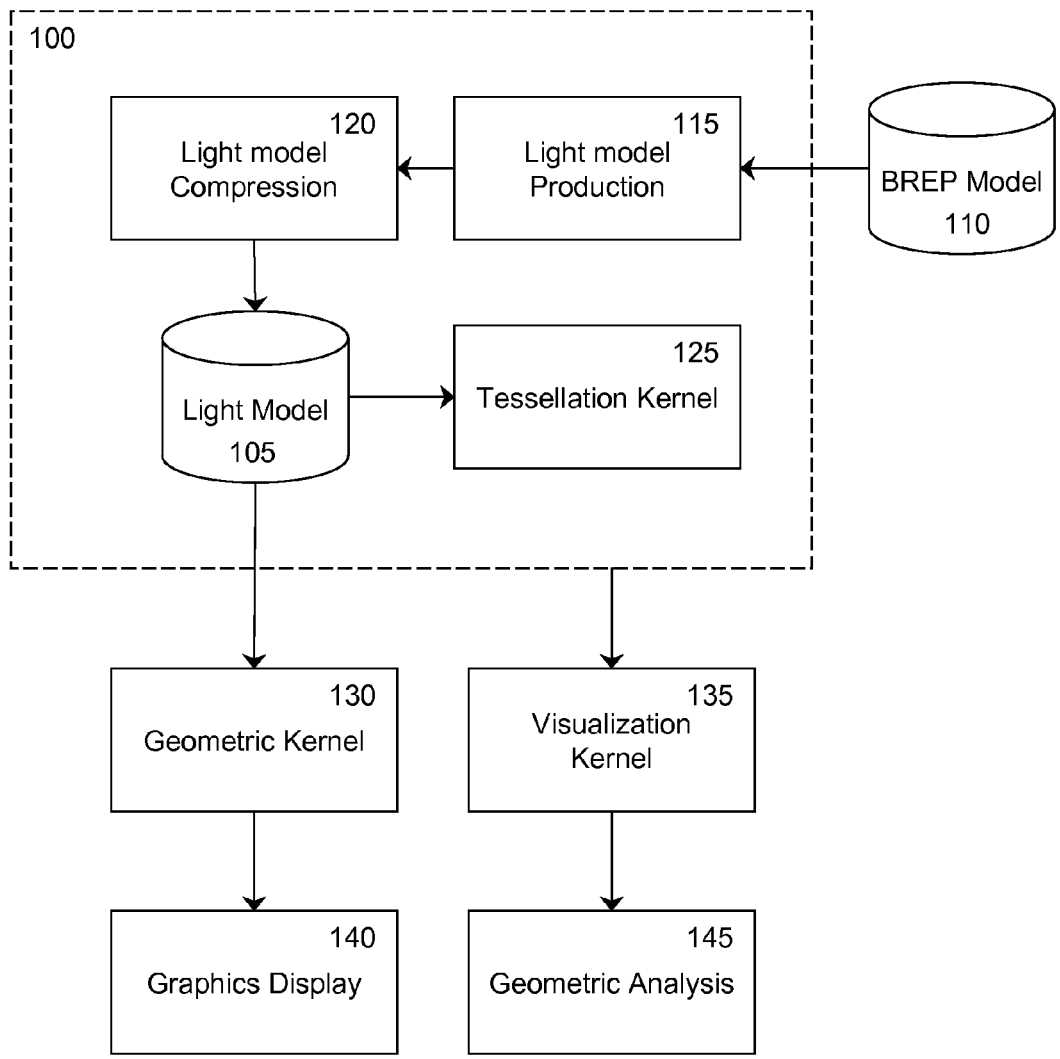
FIG. 1 is a flow diagram illustrating a visualization system.

FIG. 1 is a flow diagram illustrating a visualization system. Referring to FIG. 1, a light model visualization system, generally illustrated at 100, has a light model format stored on disk 105 produced from a BREP model 110 derived from CAD data by a light model production component 115, written to disk by a light model compression component 120, and consumed by a tessellation kernel 125, a visualization kernel 130, and a geometric kernel 135 to fulfill engineering visualization functions such as to a graphics display 140 or a geometric analysis 145.

Technique

Figure 2:
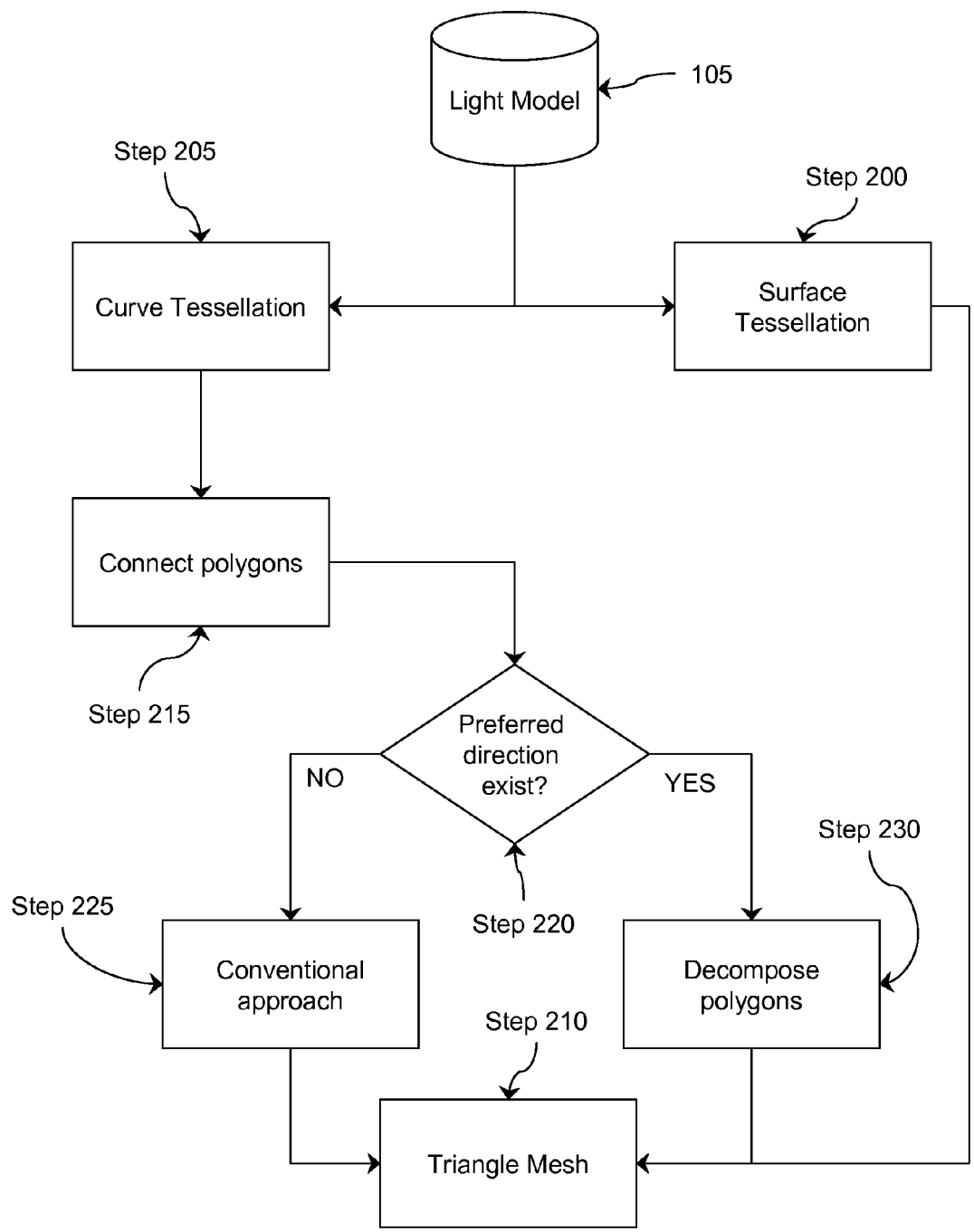
FIG. 2 is a flow chart to obtain a tessellated mesh from a light model representation

FIG. 2 is a flow chart to obtain a tessellated mesh from a light model representation. Referring to FIG. 2, the surfaces of the light model representation are tessellated (Step 200), as are the curves (Step 205). The resulting tessellated surface becomes part of a triangle mesh representation (Step 210). The process of tessellating curves produces a set of polygons. The polygons that belong to a single surface need to be connected (Step 215). A decision has to be made to connect the polygons based on the existence of a preferred direction. If the polygons are connected with certain direction restriction so that the tessellation result still matches the surface well (Step 220), then a preferred direction exists. With a preferred direction, the polygons are further decomposed into simple triangles (Step 225) utilizing known techniques to those skilled in the art. One such technique to decompose polygons is known as monotone partitioning (incorporated herein by reference) that runs in O(n log(n)) time with an input of a monotone polygon and an output a set of triangles. Returning to Step 220, if the tessellation result does not match the surface well, then a preferred direction does not exist and a conventional tessellation approach is used (Step 230) in a manner that is commonly known in the art, for example divide and conquer. The tessellated polygons are then incorporated in the triangle mesh representation (Step 210).

Operation

Figure 3:
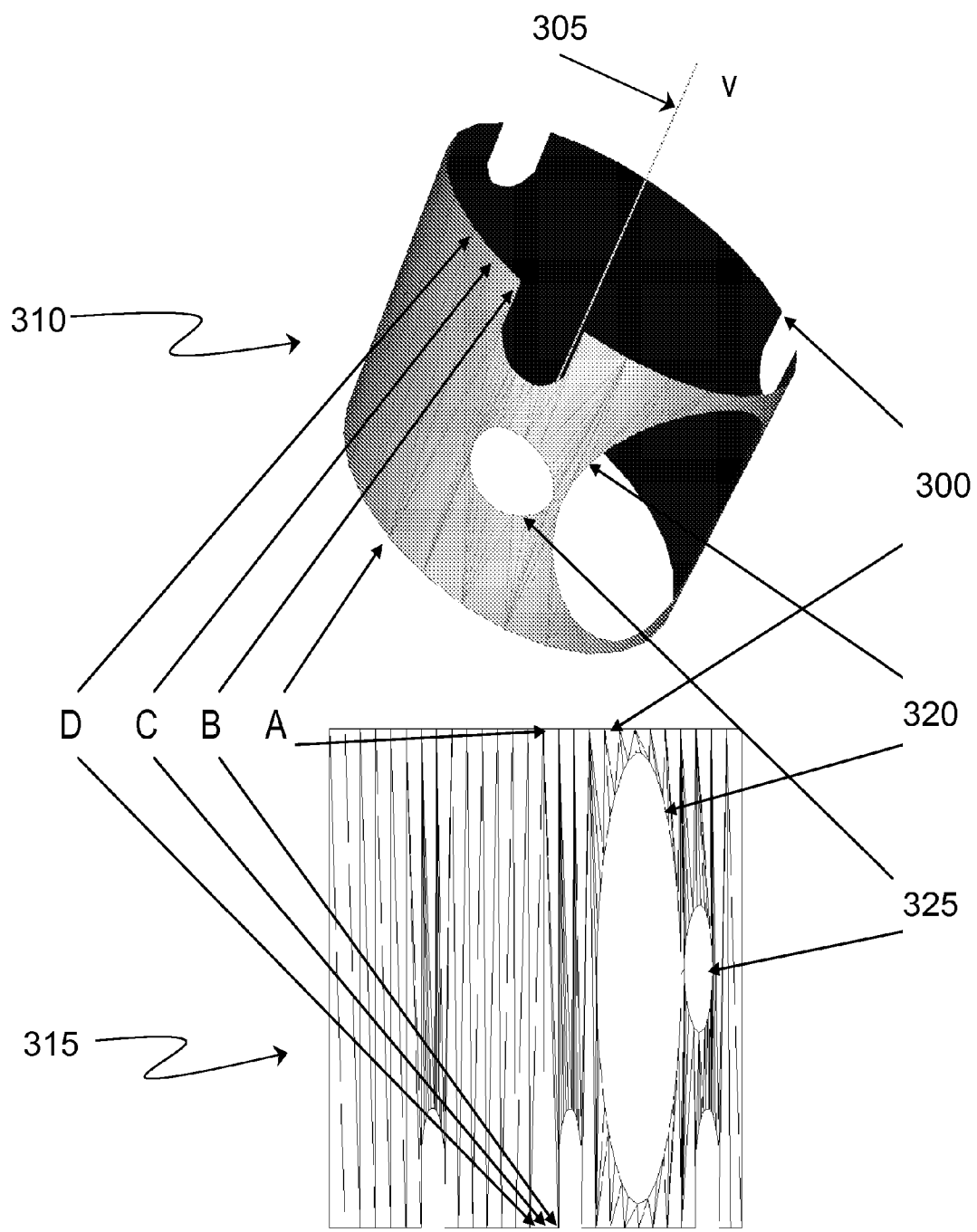
FIG. 3 is an illustration of a trimmed cylinder tessellation using the technique disclosed in the presently preferred embodiment.

FIG. 3 is an illustration of a trimmed cylinder tessellation using the technique disclosed in the presently preferred embodiment. Referring to FIG. 3, there are numerous possible ways to connect vertex A in trimmed polygon 300 to other vertices in the trimmed polygon. In fact, all the other vertices need to be geometrically evaluated in order to identify best candidate vertices B, C, and D. Even with some optimization to reduce the number of geometric evaluations, it is still computationally very expensive to available resources to produce the optimal tessellation result. For cylindrical surfaces, the directional curvature along its axis direction V 305 is zero at any surface location. This implies that the preferred direction to connect the polygon vertices is fixed at the axis direction. This is true in both a model space 310 and a parameter space 315. Therefore, for the surface shown in FIG. 3, the problem "how to produce geometrically optimal tessellation" is now turned into an equivalent problem "how to produce tessellation in the parameter space with a given preferred direction to connect the lines". For the example shown in FIG. 4, the preferred direction is the vertical direction because with cylinders, for example, the preferred direction lies in the direction of the central axis. Using the monotone partitioning algorithm in the presently preferred embodiment, one or more 2-dimensional polygons are efficiently tessellated to define a connected region, such as the three polygons indicated at B, C, and D, with a preferred direction. Although a cylindrical surface is being used as an example, the above described method can be applied to any surface type where a preferred direction produces optimal tessellation or acceptable tessellation due to its curvature characteristics. While preferred direction is directly known as parameter V direction for analytic surface types including plane, cylinder, and cone surface types, it can also exist for other surface types such as sphere, and torus, or even NURBS depending on their curvature distribution and trimming type and can be pre-computed as a Boolean flag and stored in light model. Similar techniques can be used for other trimmed polygons 320 & 325.

CONCLUSION

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments have been described. It will be understood that various modifications may be made without departing from the spirit and scope of the presently preferred embodiment. Therefore, other implementations are within the scope of the following claims.

What is claimed is:

1. A method for tessellation, comprising:
   tessellating a curve to produce a plurality of polygons;
   connecting said plurality of polygons in a preferred direction;
   decomposing the polygons into a plurality of triangles; and
   whereby a mesh representation is created from said plurality of triangles, and wherein the method is performed by a computer.

2. The method of claim 1, further comprising tessellating a surface.

3. The method of claim 1, wherein said decomposition step occurs by monotone partitioning.

4. The method of claim 1, wherein a model representation provides said curves for tessellation.

5. The method of claim 4, wherein said model representation is one of a BREP and a light model.

6. A non-transitory machine readable medium encoded with computer-executable instructions operable to cause a computer to:
   tessellate a curve to produce a plurality of polygons;
   connect said plurality of polygons in a preferred direction; and
   decompose the polygons into a plurality of triangles.

7. The machine readable medium of claim 6, further comprising tessellating a surface.

8. The machine readable medium of claim 6, wherein said decomposition step occurs by monotone partitioning.

9. The machine readable medium of claim 6, wherein a model representation provides said curves for tessellation.

10. The computer-program product of claim 9, wherein said model representation is one of a BREP and a light model.

11. A data processing system comprising:
a processor; and
an accessible memory, the data processing system configured to perform the steps of tessellating a curve to produce a plurality of polygons;
connecting said plurality of polygons in a preferred direction; and
decomposing the polygons into a plurality of triangles.

* * * * *